United States Patent Office 3,501,314
Patented Mar. 17, 1970

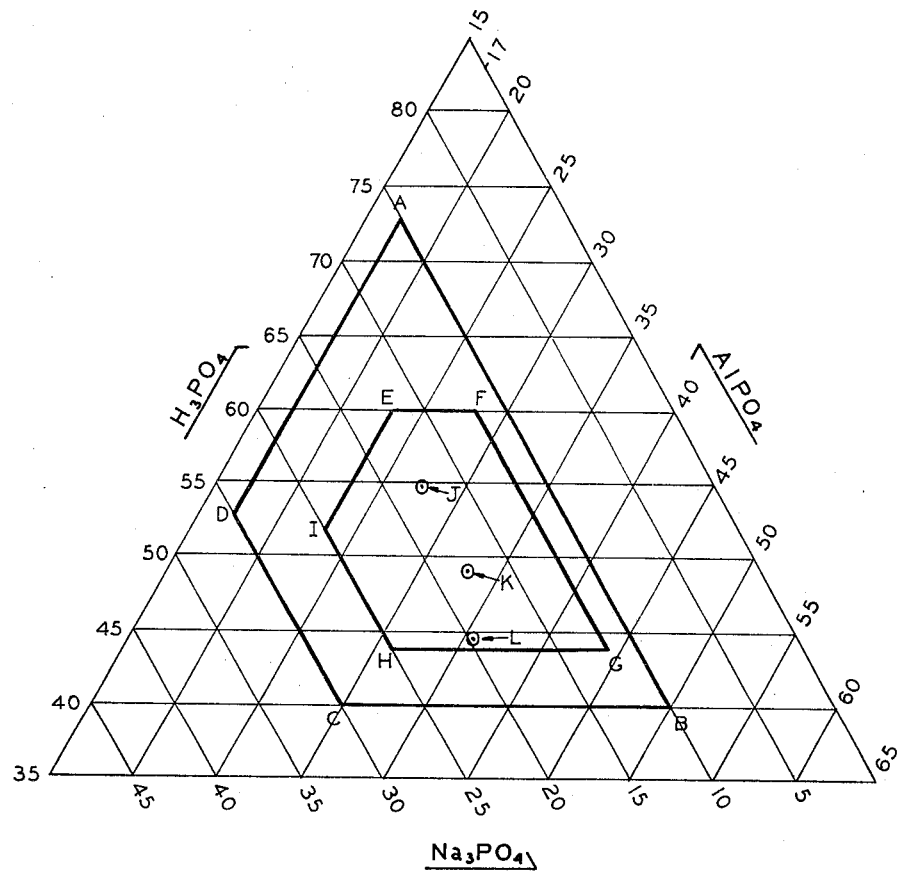

3,501,314
SODIUM ALUMINUM PHOSPHATES AND LEAVENING COMPOSITIONS CONTAINING SAME
Thomas P. Kichline, Chesterfield, Mo., and Norman Earl Stahlheber, Columbia, Ill., assignors to Monsanto Company, St. Louis, Mo., a corporation of Delaware
Filed July 23, 1962, Ser. No. 211,540
Int. Cl. A21d 2/00
U.S. Cl. 99—95                                    19 Claims This invention relates to materials useful as leavening acids, to methods for preparing the same and to compositions containing the same. More particularly, this invention relates to alkali metal aluminum acid phosphate materials.

Many materials suitable for use as leavening acids are well known in the art and numerous such materials are employed commercially. One such material which has recently met with a measure of commercial success is a crystalline sodium aluminum phosphate having a relatively high aluminum content and reportedly having the structure $NaAl_3H_{14}(PO_4)_8 \cdot 4H_2O$. The anhydrous form of this salt and a closely related amorphous material are also known. These compounds have certain properties which permit them to be employed to advantage in some instances, but for many applications leavening acids having reactivities or other characteristics different from the sodium aluminum phosphates previously available would be desirable.

It has now been found in accordance with the present invention that an entirely new and distinct class of alkali metal aluminum acid phosphates of relatively low aluminum contents can be prepared. These new phosphates have for use as leavening acids the recognized advantages of the sodium aluminum phosphate previously available and in addition provide material of different reactivities. The fact that the new compounds have a relatively low aluminum content is also quite desirable from a production cost standpoint.

In accordance with this invention there can be prepared alkali metal aluminum acid phosphate materials containing an alkali metal, aluminum, hydrogen, oxygen, and phosphorus in such proportions as to correspond, on a molar basis and disregarding any water of hydration, to from about 46 to 80% phosphoric acid, about 14% to 47% aluminum phosphate and about 6% to 22% alkali metal phosphate. The most desirable compounds on a molar basis and disregarding any water of hydration contain alkali metal, aluminum, hydrogen, oxygen and phosphorus in such proportions as to correspond to 50 to 68% $H_3PO_4$, 20 to 41% $AlPO_4$ and 8 to 18% alkali metal phosphate. Within this broad framework it has been found that several new chemical compounds exist and that it is possible to isolate at least three new sodium aluminum acid phosphates in relatively pure crystalline form. Alkali metal aluminum acid phosphates in addition to the three which have been isolated in chemically pure form have been evidenced by X-ray diffraction analyses. It has further been found that a mixture of sodium aluminum acid phosphates as above described can be employed as a leavening acid or, if desired, one of the three new crystalline sodium aluminum acid phosphates of this invention can be manufactured in pure form and employed in the preparation of baking powders, self-rising flours, frozen doughs and other products of the baking industry.

With reference to the attached drawing, there is illustrated a three component diagram covering various percentages by weight of aluminum phosphate, sodium phosphate and phosphoric acid. The new sodium aluminum phosphates of this invention, since they have an orthophosphate structure in each instance, can be considered, disregarding any water of hydration, to be formed only from aluminum orthophosphate, sodium orthophosphate and orthophosphoric acid, although it will be understood that with the exception of phosphoric acid these are not the materials normally employed in preparing the new compounds. The new sodium aluminum phosphates of this invention in each instance fall within the area indicated in FIGURE I of the drawings by the letters A, B, C and D, or in other words they in each instance upon analysis show a composition corresponding on a weight basis to from 17% to 50% $AlPO_4$, from about 10% to 30% $Na_3PO_4$, and from 40% to 73% $H_3PO_4$. The new sodium aluminum phosphates which have been found to have the most desirable properties in each instance fall within the area indicated in FIGURE I by the letters E, F, G, H, and I so that upon analysis they indicate a composition corresponding on a weight basis to from about 23% to 44% $AlPO_4$, 12% to 25% $Na_3PO_4$ and from 44% to 60% phosphoric acid. Alkali metal aluminum acid phosphates of this invention other than sodium aluminum acid phosphates have compositions corresponding to the above except that an appropriate change in percentage by weight composition must be made to reflect the difference in atomic weight of the different alkali metal cations which they contain.

One new crystalline sodium aluminum acid phosphate which can be prepared in accordance with this invention contains sodium, aluminum, hydrogen, oxygen and phosphorus in such proportions as to correspond on a weight basis to about 54.5% phosphoric acid, 27.2% $AlPO_4$ and 18.2% $Na_3PO_4$, and can be considered as having the empirical formula $Na_3Al_2H_{15}(PO_4)_8$. This new compound is indicated by the letter J in FIGURE I and is sometimes hereinafter referred to as "Compound J." The compound normally crystallizes without water of hydration although if excess phosphoric acid is present in the mixture from which crystallization is effected, relatively large amounts of free phosphoric acid may be present in the crystalline material. This new crystalline sodium aluminum acid phosphate can be identified by X-ray diffraction, the major interplaner spacings and intensities being listed in Table I. The new compound is characterized by low hygroscopicity and excellent performance as a leavening acid. It is the most reactive of the three new crystalline sodium aluminum phosphates which have thus far been isolated in substantially pure crystalline form in accordance with this invention and is the best suited of the three for most applications.

The second of the new crystalline sodium aluminum phosphates of this invention contains sodium aluminum, hydrogen, phosphorus and oxygen in such proportions as to correspond on a weight basis to about 49% phosphoric acid, about 33% $AlPO_4$ and about 18% $Na_3PO_4$. A typical analysis is 48.6% $H_3PO_4$, 33.0% $AlPO_4$ and 18.5% $Na_3PO_4$, which corresponds to an empirical formula of $Na_5Al_4H_{22}(PO_4)_{13}$. It is indicated by the letter K in FIGURE I and is sometimes hereinafter referred to as "Compound K." This new compound is generally similar to the first compound described above except that its neutralization equivalent is slightly lower and its reactivity is slightly less. The new compound can be identified by X-ray diffraction analysis, the major interplaner spacings and intensities being listed in Table I.

The third new crystalline compound of this invention is one, ignoring water of hydration, containing sodium, aluminum, hydrogen, oxygen and phosphorus in proportions to correspond on a weight basis to about 45% phosphoric acid, about 35% $AlPO_4$ and about 20% $Na_3PO_4$, a typical analysis being 44.8% $H_3PO_4$, 35.4% $AlPO_4$ and 19.8% $Na_3PO_4$. This new compound normally crystallizes as a hydrate which can be assigned the empirical formula $Na_5Al_4H_{19}(PO_4)_{12} \cdot 2.5H_2O$ and in this form it has excellent characteristics in so far as hygroscopicity is concerned. While this salt normally crystallizes as a hydrate, the anhydrous form can readily be prepared by drying the hydrate at 160° C. for from 1 to 2 hours. The anhydride is indicated by the letter L in FIGURE I and is sometimes hereinafter referred to as "Compound L." The new crystalline material can be identified by X-ray diffraction analysis, the major interplaner (d) spacings and intensities being set forth in Table I.

TABLE I.—XRD PATTERNS OF NEW CRYSTAL SPECIES

| Compound J | | | Compound K | | | Compound L·2½H₂O | | |
|---|---|---|---|---|---|---|---|---|
| Cu K 2θ | (d) A. | I/I₀ | Cu K 2θ | (d) A. | I/I₀ | Cu K 2θ | (d) A. | I/I₀ |
| 10.6 | 8.34 | 100 | 10.9 | 8.12 | 100 | 14.0 | 6.32 | 100 |
| 21.4 | 4.15 | 65 | 21.7 | 4.10 | 80 | 25.8 | 3.45 | 65 |
| 32.4 | 2.76 | 30 | 28.9 | 3.09 | 80 | 31.8 | 2.81 | 55 |
| 29.4 | 3.04 | 25 | 30.1 | 2.97 | 70 | 29.0 | 3.08 | 40 |
| 28.6 | 3.12 | 20 | 31.1 | 2.87 | 45 | 28.2 | 3.16 | 25 |
| 22.6 | 3.93 | 15 | 15.3 | 5.80 | 40 | 22.4 | 3.97 | 20 |
| 29.1 | 3.07 | 15 | 24.9 | 3.57 | 35 | 23.9 | 3.72 | 20 |
| 14.9 | 5.94 | 10 | 29.4 | 3.04 | 35 | 14.4 | 6.15 | 15 |
| 15.8 | 5.60 | 10 | 25.8 | 3.45 | 30 | 19.0 | 4.67 | 15 |
| 22.2 | 4.00 | 10 | 22.4 | 3.97 | 25 | 25.3 | 3.52 | 15 |
| 25.0 | 3.56 | 10 | 33.1 | 2.70 | 25 | 30.6 | 2.92 | 15 |
| 27.9 | 3.20 | 10 | 26.3 | 3.39 | 20 | 12.5 | 7.08 | 10 |
| 29.9 | 2.99 | 10 | 33.7 | 2.66 | 15 | 32.3 | 2.77 | 10 |
| 31.8 | 2.81 | 10 | 27.2 | 3.28 | 10 | 32.6 | 2.75 | 10 |
| 42.1 | 2.14 | 10 | 27.8 | 3.21 | 10 | 36.0 | 2.50 | 10 |
| 20.7 | 4.29 | 5 | 36.0 | 2.49 | 10 | 22.8 | 3.90 | 5 |
| 26.9 | 3.31 | 5 | 37.6 | 2.39 | 10 | 33.6 | 2.66 | 5 |
| 27.9 | 3.20 | 5 | 40.2 | 2.24 | 10 | | | |

The new compounds of this invention are preferably made by a novel procedure which comprises reacting an aqueous solution of an aluminum acid phosphate with an alkali metal compound, and evaporating the aqueous solvent to the extent necessary to produce a product containing not more than about 5% to 10% free water and preferably less than about 2% free water while maintaining any solid matter in the reaction mixture substantially uniformly dispersed during the time that the solvent is being evaporated. This new method is of general applicability and can be used to prepare any of the new materials of this invention as well as any of the alkali metal aluminum phosphates previously known and which have heretofore been prepared by other procedures.

It is a primary advantage of this new process that it does not require the presence of excess phosphoric acid above that theoretically required in the desired product. In order to achieve satisfactory crystallization, prior art procedures for preparing alkali metal aluminum acid phosphates have required the presence during crystallization of excess phosphoric acid, and since the presence of excess phosphoric acid in the end product is not normally desirable, special steps have been required to eliminate the excess acid. In one known procedure the excess acid is eliminated by the use of an organic solvent such as methanol but such a procedure introduces the further problem of solvent recovery and greatly increases the operating cost of the process. Still another known procedure comprises neutralizing the excess phosphoric acid with lime or the like but such a neutralization step results in contamination of the desired product with a foreign material which is not always desirable.

The ratio of aluminum to phosphate cations in the aluminum acid phosphate should be such that when it is mixed with the alkali metal material the resulting mixture contains alkali metal and aluminum ions in substantially the exact ratio that these elements are present in the desired product. This is not to say, however, that a portion of the phosphate or aluminum ion may not be provided by the alkali metal material and to the contrary this material may contain, for example, a sodium orthophosphate to provide additional phosphate ions where the aluminum acid phosphate material does not contain the desired proportion of phosphate. As another example, the alkali metal material may contain sodium aluminate so that it provides aluminum ions in addition to those provided by the aluminum acid phosphate material. When employing the preferred process as outlined above, the ratio of phosphate ions to metal ions in the mixture of aluminum acid phosphate and alkali metal base materials should be such as to provide not more than about 1% excess phosphoric acid over that theoretically present in the desired product. If more than about 1 to 3% excess phosphoric acid is present the resulting product will be undesirably hygroscopic and will not have good physical properties, and if the choice of reagents is such as to result in more than 1 to 3% excess phosphoric acid, a conventional procedure such as mentioned above should be employed which results in the elimination of such excess.

The aluminum acid phosphate employed as a starting material in the preferred procedure outlined above can be prepared by known techniques and is preferably prepared simply by mixing together aluminum oxide trihydrate and phosphoric acid. However, there are numerous variations of this basic procedure and in place of straight phosphoric acid one can employ a mixture of phosphoric acid and monosodium phosphate, or one can employ in place of the aluminum oxide a mixture of aluminum oxide and sodium aluminate or aluminum phosphate. One can even employ metallic aluminum in place of aluminum oxide but this is usually not advantageous since difficulty is frequently encountered in completely converting the metallic aluminum to aluminum acid phosphate. Most procedures for preparing aluminum acid phosphates result in an aqueous solution of the product and it is an advantage of the invention that the aqueous solution as thus prepared can be employed directly. However, if desired, the aluminum acid phosphate can be prepared using procedures which result in a solid water soluble product.

While theoretically there can be employed in preparing the new materials of this invention any alkali metal compound capable of ionizing in aqueous solution to provide the desired alkali metal cation necessary in the formation of the alkali metal aluminum acid phosphate, one is largely limited as a practical matter to the use of alkali metal carbonates, orthophosphates and hydroxides to avoid contamination of the desired product and for other reasons. The hydroxides and in particular sodium hydroxide and potassium hydroxide are normally preferred, although in some instances the use of a phosphate salt such as monosodium orthophosphate either alone or in combination with an alkali metal base is advantageous in order to bring the amount of phosphate ion in the reaction mixture to the desired level. The use of an alkali metal salt of an acid which normally exists as a vapor or which decomposes into gaseous decomposition products at the temperature at which the reaction is conducted is permissible and one can employ, for example, an alkali metal carbonate such as sodium carbonate or potassium carbonate. However, the use of a carbonate is not always advantageous since it results, due to the liberation of carbon dioxide, in undesirable bubbling of the reaction mixture. The use of other salts of volatile acids, such as an alkali metal halide, as illustrated by NaCl, is seldom if ever advantageous because of the corrosive nature of the evolved gas and/or because of the resulting contamination of the product.

Both the aluminum acid phosphates and the alkali metal materials are preferably employed in the form of aqueous solutions. The solutions of either can contain water miscible solvents in addition to water and, for example, may contain 5 to 50% methyl alcohol but such is seldom advantageous and substantially pure water normally constitutes the preferred solvent. The amount of aqueous solvent employed can be varied within relatively wide limits, but since the solvent must be removed by evaporation it is not normally advantageous to employ a large excess of solvent in either the solution of the aluminum acid phosphate or the solution of the alkali metal material. At the other extreme at least enough solvent should be employed to permit thorough mixing of the materials and to avoid the formation of large quantities of difficultly soluble basic aluminum phosphates when the aluminum acid phosphate and alkali metal compounds are mixed together. Satisfactory results can usually be obtained without difficulty using solutions in each instance containing from about 10 to 80% by weight solids although the solutions employed preferably have in each instance a concentration of from about 50 to 75 weight percent solids. The two solutions can be mixed together in any conventional manner but preferably the solution of the alkali metal compound is added with agitation to the solution of the aluminum acid phosphate, and this is particularly true when an alkali metal hydroxide is employed since this minimizes the formation of localized areas of high base concentration and the formation of difficultly soluble basic aluminum phosphates.

In accordance with the preferred procedure outlined above, the reaction mixture resulting from the intermixing of aqueous solutions of an aluminum acid phosphate and alkali metal base is evaporated to dryness with agitation. The use of adequate agitation during the terminal stages of the reaction is quite important since in most instances the reaction mixture is quite heavily loaded with solid materials long before any of the desired product is formed. In fact, in almost no instance is a major amount of the desired product formed prior to the point at which the free water content of the reaction mixture is reduced below about 10%. In other words, if one removes by mechanical means such as filtration or decantation some of the solid material present in the reaction mixture prior to the point at which the water content of the mixture is reduced below 10% it will be found that the solid material is not predominantly the desired product and this is quite probably a primary reason that the simple process of this invention remained so long undiscovered. In order to obtain efficient yields it is normally necessary that agitation of the mixture, to the extent necessary to keep the solid material in the mixture uniformly distributed with respect to the remaining solvent in the mixture, be continued until the free water content of the mixture has been reduced well below 5% and, for example, best results are normally obtained when the free water content is reduced to below about 2% before agitation of the mixture is terminated. In some instances, for example when 1 to 3% uncombined phosphoric acid is present, or when organic solvents are used in addition to the aqueous solvent, relatively high yields can be obtained by terminating the process when the reaction mixture contains relatively higher percentages of free water, but even in these instances it is usually preferable to reduce the free water content of the reaction mixture below about 2% before terminating agitation.

The composition of the alkali metal aluminum acid phosphate product is determined primarily by the proportions of aluminum ion, alkaline earth metal ion and phosphate ion present in the reaction mixture employed for its preparation and if, for example, one employs in accordance with the preferred procedure outlined above ingredients to furnish the various components in the theoretical ratio for the formation of Compound J, the product will be predominantly Compound J. If one desires a relatively pure crystalline product a seeding step may be utilized, for example by adding from about 1 to 5% of the crystalline compound desired to the reaction mixture when the free water level in the reaction mixture has reached approximately 5%. In almost every instance, however, when special precautions are not taken to obtain a pure crystalline compound, a mixture of materials will result and it has been found that the amounts of the various aluminum phosphates in such mixtures can be varied to a degree by changing reaction conditions or by seeding techniques. For example, it has been found that low crystallization temperatures usually favor the formation of Compound L whereas high crystallization temperatures usually favor the formation of Compound J and, other conditions being constant, one can vary the proportions of these materials formed simply by changing the crystallization temperature.

It is an important feature of the novel process of this invention that the crystal size of the product can be controlled by variation of the temperature of the reaction mixture during crystallization of the product, or in other words, during the time that the last 10% of the aqueous solvent in the mixture is removed by evaporation. As a general rule, and other factors being the same, the higher the crystallization temperature the larger the crystal size. The temperature of the reaction mixture during crystallization of the desired product can be controlled by varying the pressure at which evaporation of the solvent is conducted and, for example, by the use of a vacuum rapid vaporization of the solvent can be conducted at temperatures as low as about 70° C. to 90° C. with satisfactory results and by utilizing super-atmospheric pressure evaporation of the solvent can be effected at temperatures of 180° C. or higher. It is frequently important to control crystal size because it has been found that the hygroscopicity, flowability and reactivity of the product all depend to some extent upon crystal size. The reactivity and hygroscopicity of the product increase with decreasing crystal size but the flowability decreases so that if one desires a highly reactive product it is normally best to effect crystallization under vacuum, but if one is primarily interested in a readily flowable, nonhygroscopic product and is not primarily concerned with reactivity it is normally advantageous to conduct crystallization at higher temperatures, for example at from about 140° C. to 180° C.

The rate at which the solvent is evaporated from the reaction mixture is not of great importance insofar as obtaining a satisfactory product is concerned, but since agitation is required during crystallization, the use of long crystallization periods is not normally advantageous from an economic point of view. Also it has been found that if exceedingly long crystallization periods, for example 72 hours or longer, are utilized the product is in some instances contaminated with difficultly soluble basic phosphates and this is an additional reason why the crystallization period should not be unduly prolonged. At the other extreme, if vaporization of the solvent is effected substantially instantaneously, the alkali metal aluminum acid phosphate thereby produced will be predominantly amorphous in nature; however, the amorphous material can be quite satisfactorily employed as a leavening acid and this is not objectionable unless one desires a crystalline material for reasons of appearance or otherwise. If predominantly crystalline material is desired, one should not employ spray drying techniques or even a high capacity drum drier but rather should employ a technique which provides at least about 5 minutes to one hour for the solvent level of the reaction mixture to be reduced from about 20% to less than about 5% by weight.

Following crystallization, the alkali metal aluminum acid phosphate product can be processed by conventional techniques to effect changes in its physical form. For example, the product can be subjected to a conventional grinding operation to reduce its particle size or the material may be screened to remove oversize particles. In many instances it is desirable to coat the crystals of alkali metal aluminum phosphate with a conditioning agent such as tricalcium phosphate, dicalcium phosphate dihydrate, or other alkali metal or alkaline earth metal phosphate conditioner to increase flowability and to reduce hygroscopicity. Other conditioning agents which can be employed but which normally are not so desirable as the phosphate conditioners include calcium hydroxide and aluminum oxide. For most applications from about 1 to 10% of the basic conditioner produces satisfactory results.

The new alkali metal aluminum acid phosphates of this invention, containing a flow conditioner if desired, can be employed as such in a conventional manner as leavening acids or they can be mixed with other materials to modify their gas liberating characteristics, storage stability, etc. For example, the new materials can be mixed with conventional leavening acids such as sodium acid pyrophosphate, anhydrous monocalcium orthophosphate, sodium aluminum sulphate, or calcium sulphate to provide mixtures which are well suited for use as leavening acids. A combination which has been found to be exceedingly satisfactory as a leavening acid for many applications comprises from about 50 to 95% of one of the new alkali metal aluminum acid phosphates of this invention and, in particular, "Compound J," from 1 to 10% of a conditioning agent such as tricalcium phosphate, and from about 5 to 50% of a delayed action anhydrous monocalcium phosphate leavening acid. Such a composition when employed as a leavening acid produces excellent results over a wide range of conditions. Another combination of materials which has been found to be particularly effective for some leavening applications comprises from 70 to 95% of one of the new materials of this invention, from 1 to 10% of a conditioning agent such as tricalcium phosphate, and from about 1 to 25% and preferably 2 to 20% calcium carbonate. The calcium carbonate in this mixture provides an unexpected stabilizing effect upon the alkali metal aluminum acid phosphate and additionally provides calcium so that the mixture is particularly advantageous for use in self-rising flours.

The invention will now be illustrated by the following specific examples in which all parts are by weight unless otherwise indicated.

EXAMPLE 1

Preparation and use of crystalline compound J

In a suitable reaction vessel equipped with agitation means there is placed 116.7 parts of 75% $H_3PO_4$ to which there is slowly added 17.4 parts of $Al_2O_3 \cdot 3H_2O$. The resulting mixture is then stirred and retained at a temperautre of approximately 90° C. until solution is complete (normally 10 to 20 minutes). There is then added over a period of approximately 30 minutes and while maintaining the aluminum acid phosphate solution in a state of movement through relatively vigorous agitation, 26.8 parts of 50% sodium hydroxide solution. When addition of the sodium hydroxide solution is complete the reaction mixture is brought to a boil and is allowed to remain at the boiling temperature until the free water content thereof has been reduced to approximately 20% by weight, the mixture being mechanically agitated. The mixture is then placed under a vacuum and maintained in a boiling condition while simultaneously reducing the pressure to the point at which the reaction mixture boils at a temperature of 110° C. Continuing mechanical agitation and holding the temperature of the mixture at 110° C., the pressure over mixture is then slowly reduced as further water is removed until the free water content of the mixture is less than 1% and the mixture is essentially a dry powder. Analysis shows the material to be in excess of 90% Compound J having the empirical formul $Na_3Al_2H_{15}(PO_4)_8$. The crystal size is quite small, less than about 1 to 5 microns average diameter, so that the material is a highly active leavening acid.

To 95 parts of Compound J prepared as above there is needed one part of tricalcium phosphate and 4 parts by weight of calcium carbonate and the resulting mixture is blended to result in a uniform distribution of the components. This mixture is an excellent cake leavener and satisfactory results are obtained using, for example, 0.68 part of the mixture and 0.68 part of sodium bicarbonate per 100 parts of cake mix.

A satisfactory self-rising flour is prepared by blending together 1.35 parts of the above Compound J mixture, 100 parts of wheat flour, 2.0 parts of sodium chloride and 1.35 parts of baking soda. The resulting blend has excellent storage characteristics such that even after two months storage its use in producing baked goods produced satisfactory results.

A mixture of 80 parts of Compound J, 5 parts of tricalcium phosphate, and 15 parts of $CaCO_3$ is made by means of a mechanical blender and a self-rising flour is then prepared by using 1.69 parts of this mixture, 100 parts flour, 2.0 parts of NaCl and 1.35 parts of soda. This flour not only gives excellent results and has outstanding storage characteristics but also meets the standards of identity for enriched self-rising flour.

To 70 parts of Compound J prepared as above there is added 2 parts of tricalcium phosphate and 8 parts of $CaCO_3$ and 20 parts of an anhydrous monocalcium orthophosphate leavening acid sold by Monsanto Chemical Company under the registered trademark "Py-Ran." The resulting mixture is uniformly blended and used as follows in the preparation of a biscuit dough:

1.69 parts of leavening acid mixture
1.35 parts of baking soda
100 parts of wheat flour
73 parts of milk
11 parts of shortening The resulting dough or the cut biscuits therefrom can be held for varying times at room temperature before completion of the baking process. It is found that this leavening acid mixture produces excellent results in an immediate bake test and also provides satisfactory results when baking is delayed for times up to 20 minutes or more. The dough can also be made into balls and held in a refrigerator for 24 hours or more with the same satisfactory results. In fact, the results obtained at 20 minutes or 24 hours in the above cases are superior to those obtainable with any previously available leavening acid.

EXAMPLE 2

Preparation and use of Compound K

In a suitable reaction vessel equipped with stirrer means there is placed 21.1 parts of $Al_2O_3 \cdot 3H_2O$ and 114.8 parts 75% $H_3PO_4$ and the resulting mixture is retained at a temperature of about 90° C. until solution is complete. There is then slowly added to the resulting mixture 27.0 parts of a 50% by weight solution of sodium hydroxide and the mixture is then raised to the boiling point allowing the evolved carbon dioxide to escape to the atmosphere. The temperature of the mixture is then gradually raised to the extent necessary to maintain the mixture at a good boil while allowing the evolved steam to escape and while vigorously agitating the mixture. When the temperature of the reaction mixture reaches 110° C. it is held at this temperature until a dry appearing powder is obtained. Upon analysis the product proves to be more than 90% crystalline Compound K.

Seventy parts by weight of Compound K as prepared above are mixed with 20 parts by weight of sodium aluminum sulphate and 10 parts of anhydrous monocalcium phosphate and the ingredients are uniformly blended together. A sample of the resulting mixture is used in a conventional manner as a leavening acid in the preparation of biscuit dough and is found to produce a light colored biscuit having a good texture.

EXAMPLE 3

Preparation of Compound L

Into a suitable reaction vessel there is placed 21.9 parts of $Al_2O_3 \cdot 3H_2O$ and 110.0 parts of 70% $H_3PO_4$ and the resulting mixture is stirred at a temperature of 90° C. until the solution is complete. There is then slowly added 18.5 parts of $Na_2CO_3$ and the resulting mixture is brought to a good boil with constant agitation. Water is removed by boiling until the boiling temperature of the mixture is approximately 120° C. and the mixture is held in this temperature region until a dry-appearing powder is obtained. Upon cooling and analysis the product is found to be the hydrate of Compound L. The average crystal size of this material is about 1–10 microns and the material has an exceptionally low hygroscopicity. It is only moderately active as a leavening acid but can be blended with conventional leavening acids or Compound J to produce a doube acting effect.

EXAMPLE 4

The procedure of Example 1 is repeated except that there is employed 19.1 parts of $Al_2O_3$, 115 parts of 75% $H_3PO_4$ and 29.3 parts of 50% NaOH. The resulting product is a crystalline material which is a mixture of Compound J with several other sodium aluminum acid phosphates which cannot be readily prepared in pure crystalline form. The mixture when used alone or in a combination with other leavening acids produces excellent results.

EXAMPLE 5

Example 1 is repeated except that crystallization is effected at temperatures of from 140 to 180° C. The resulting product has a particle size predominantly within the range of from 5 to 15 microns with some crystals in the 20–30 micron size range, and demonstrates excellent characteristics with regard to flow and hygroscopicity.

Having thus described our invention and several preferred embodiments thereof, what we desire to claim and secure by Letters Patent is:

1. An alkali metal aluminum acid orthophosphate material containing sodium, aluminum, hydrogen, oxygen and phosphorus in such proportions as to correspond on a molar basis and disregarding any water of hydration, to from about 46 to 80% phosphoric acid, about 14 to 47% aluminum phosphate and about 6 to 22% alkali metal phosphate.

2. An alkali metal aluminum acid orthophosphate material according to claim 1 corresponding on a molar basis to from about 50 to 68% phosphoric acid, 20 to 41% aluminum phosphate, and 8 to 18% alkali metal phosphate.

3. A sodium aluminum acid orthophosphate material formed from the elements sodium, aluminum, hydrogen, oxygen and phosphorus in such proportions as to correspond, disregarding any water of hydration, to from about 40 to 73 weight percent phosphoric acid, 17 to 50 weight percent aluminum phosphate, and 10 to 30 weight percent trisodium phosphate.

4. A sodium aluminum acid orthophosphate material in accordance with claim 3 corresponding to from about 44 to 60 weight percent phosphoric acid, 23 to 44 weight percent aluminum phosphate, and 12 to 25% trisodium phosphate.

5. A leavening composition comprising (1) from about 50% to 95% by weight of a sodium aluminum acid orthophosphate material formed from the elements sodium, aluminum, hydrogen, oxygen and phosphorus in such proportions as to correspond, disregarding any water of hydration, to from about 40 to 73 weight percent phosphoric acid, 17 to 50 weight percent aluminum phosphate, and 10 to 30 weight percent trisodium phosphate, (2) from about 1% to 25% by weight of calcium carbonate, and (3) from about 1% to 10% by weight of a conditioning agent selected from the group consisting of calcium hydroxide, aluminum oxide, alkali metal phosphates, and alkaline earth metal phosphates.

6. A leavening composition as in claim 5 wherein said conditioning agent is a calcium phosphate salt.

7. A leavening composition as in claim 5 additionally containing from about 5 to 50% of an anhydrous monocalcium phosphate leavening acid.

8. A composition according to claim 6 wherein said calcium phosphate salt is tricalcium phosphate.

9. An anhydrous crystalline sodium aluminum acid orthophosphate having the empirical formula $$Na_3Al_2H_{15}(PO_4)_8$$

10. A crystalline sodium aluminum acid phosphate having the empirical formula 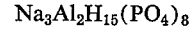

11. A crystalline sodium aluminum acid phosphate having the empirical formula $$Na_5Al_4H_{19}(PO_4)_{12} \cdot 2.5H_2O$$

12. A method for producing an alkali metal aluminum orthophosphate material which comprises forming an aqueous mixture containing an aluminum acid phosphate and an alkali metal material selected from the group consisting of alkali metal hydroxides, alkali metal orthophosphate salts, alkali metal carbonates and alkali metal chlorides, and mixtures thereof, the proportions of reactants in said mixture being such as to correspond to, on a molar basis and disregarding the water content of said mixture, from about 46 to 80% phosphoric acid, 14 to 47% aluminum phosphate, and 6 to 22% alkali metal phosphate, heating said mixture to effect vaporization of water therefrom, and continually agitating said mixture while the water content thereof is reduced from about 20% by weight to less than about 10% by weight.

13. A method according to claim 12 wherein the temperature of said aqueous mixture during such time that its water content is reduced from about 20% to less than about 10% and the pressure under which said vaporization is conducted are correlated to produce a product having a preselected particle size.

14. A method for producing a sodium aluminum acid orthophosphate material which comprises forming an aqueous mixture containing an aluminum acid phosphate and a material selected from the group consisting of sodium hydroxide, sodium orthophosphates, sodium salts of volatile acids, and mixtures thereof, the proportions of reactants in said mixture being such as to correspond on a weight basis, disregarding the water in said mixture, to from about 44 to 60% phosphoric acid, 23 to 44% $AlPO_4$, and 12 to 25% $Na_3PO_4$, heating said mixture to effect vaporization of water therefrom, and continually agitating said mixture while the water content thereof is reduced from about 20% by weight to less than about 5% by weight.

15. A method according to claim 14 wherein the proportions of said reactants are such, disregarding the water in said mixture, as to correspond on a weight basis to about 55% phosphoric acid, 27% $AlPO_4$, and 18% $Na_3PO_4$, whereby a crystalline material represented by the empirical formula $Na_3Al_2H_{15}(PO_4)_8$ is produced.

16. A method according to claim 14 wherein the proportions of said reactants are such, disregarding the water in said mixture, as to correspond on a weight basis, to about 49% phosphoric acid, 33% $AlPO_4$, and 18% $Na_3PO_4$, whereby a crystalline material represented by the empirical formula $Na_5Al_4H_{22}(PO_4)_{13}$ is produced.

17. A method according to claim 14 wherein the proportions of said reactants are such, disregarding the water in said mixture, as to correspond on a weight basis to about 44% phosphoric acid, 35% $AlPO_4$, and 20% $Na_3PO_4$, whereby a crystalline material represented by the empirical formula $Na_5Al_4H_{19}(PO_4)_{12} \cdot 2.5\ H_2O$ is produced.

18. A crystalline sodium aluminum acid orthophosphate in which the sodium:aluminum:acidic hydrogen:phosphate ratio is 3:2:15:8.

19. A leavening composition comprising from about 50% to about 95% of an anhydrous crystalline sodium aluminum acid orthophosphate having the empirical formula $Na_3Al_2H_{15}(PO_4)_8$ and from 5% to 50% of a delayed action anhydrous monocalcium phosphate leavening acid.

References Cited

UNITED STATES PATENTS

| | | | |
|---|---|---|---|
| 2,550,490 | 4/1951 | McDonald | 23—107 |
| 2,774,672 | 12/1956 | Griffith | 23—106 X |
| 2,957,750 | 10/1960 | Knox | 23—105 |
| 2,995,421 | 8/1961 | Dyer | 23—105 |
| 3,041,177 | 6/1962 | Lauck et al. | 99—95 |
| 3,223,479 | 12/1965 | Vanstrom | 23—107 |
| 3,223,480 | 12/1965 | Vanstrom | 23—107 |

OTHER REFERENCES

Van Wazer, "Phosphorus and Its Compounds," vol. 2, Interscience Pub., Inc., New York, 1961, pp. 1619–1621.

HERBERT T. CARTER, Primary Examiner

U.S. Cl. X.R.

23—105; 99—84, 86, 92